United States Patent [19]
Ladang et al.

[11] Patent Number: 5,804,319
[45] Date of Patent: *Sep. 8, 1998

[54] SEPARATION DEVICE FOR SHEET PRODUCTS AND ITS FABRICATION PROCESS

[75] Inventors: Michel M. Ladang, Herve; Dhafer M. Testouri, Dison, both of Belgium

[73] Assignees: Saint-Gobain Vitrage, Courbevoie, France; Norton S.A. Performances Plastics, Chaineux, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 670,785

[22] Filed: Jun. 24, 1996

[30] Foreign Application Priority Data

Jun. 22, 1995 [FR] France ................................. 95 07465

[51] Int. Cl.$^6$ ............................ B65G 85/48; B65B 23/20
[52] U.S. Cl. ........................... 428/441; 428/442; 428/343
[58] Field of Search ................................. 428/441, 442, 428/343

[56] References Cited

U.S. PATENT DOCUMENTS

| 4,487,807 | 12/1984 | Duffer et al. ................... 428/441 X |
| 4,683,172 | 7/1987 | Le Grand et al. ................ 428/442 X |
| 4,910,074 | 3/1990 | Fukawa et al. .................. 428/441 X |
| 5,372,887 | 12/1994 | Segawa et al. ................... 428/441 X |
| 5,451,457 | 9/1995 | McCurdy et al. ................. 428/441 |
| 5,547,762 | 8/1996 | Niwa et al. ..................... 428/442 |

FOREIGN PATENT DOCUMENTS

| 0 375 563 | 6/1990 | European Pat. Off. . |
| 375563 | 6/1990 | European Pat. Off. . |
| 489658 | 12/1991 | European Pat. Off. . |
| 0489658 | 6/1992 | European Pat. Off. . |
| 2116643 | 12/1970 | France . |
| 2116643 | 6/1972 | France . |
| 2221003 | 3/1973 | France . |
| 2221003 | 9/1974 | France . |
| 1368264 | 11/1971 | United Kingdom . |

*Primary Examiner*—Daniel Zirker
*Attorney, Agent, or Firm*—Oblon, Spivak, McClelland, Maier & Neustadt, P.C.

[57] ABSTRACT

The invention pertains to a separation device which is to be temporarily inserted between two sheet products, in particular between two plates of glass, and which has differentiated adhesion with these two sheet products. The separation device is essentially made of a thermofusible material which has an ability to absorb shocks and an ability to obtain for one of its two sides, a controlled and desirable adhesion with the sheets to be separated.

12 Claims, 3 Drawing Sheets

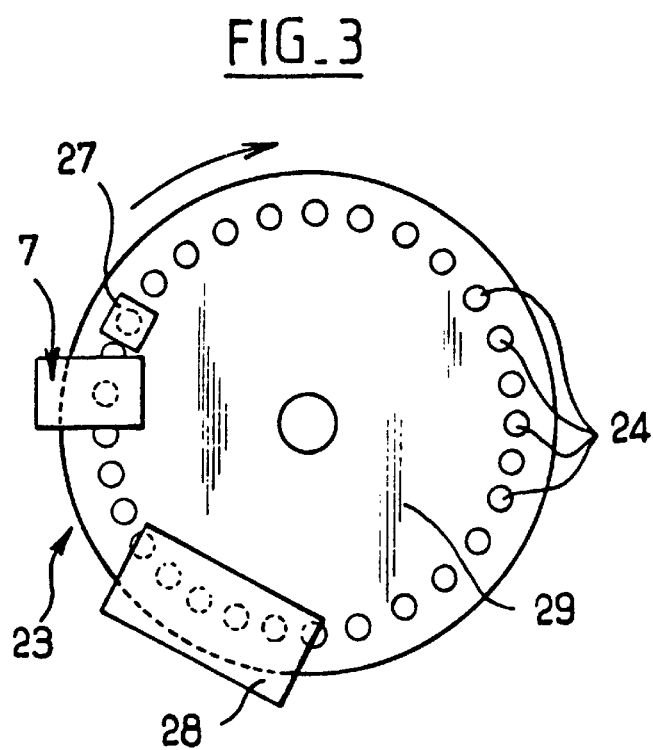
FIG_3
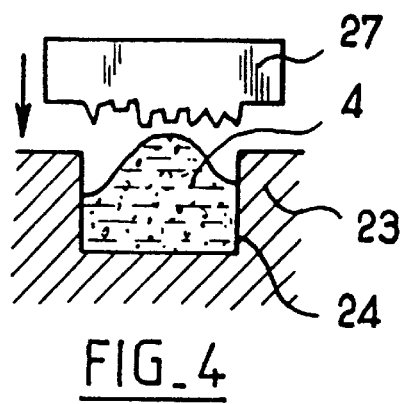
FIG_4
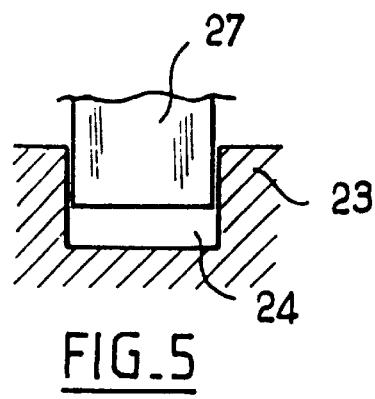
FIG_5
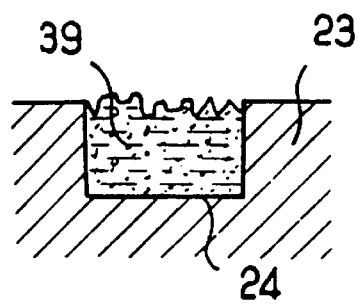
FIG_6
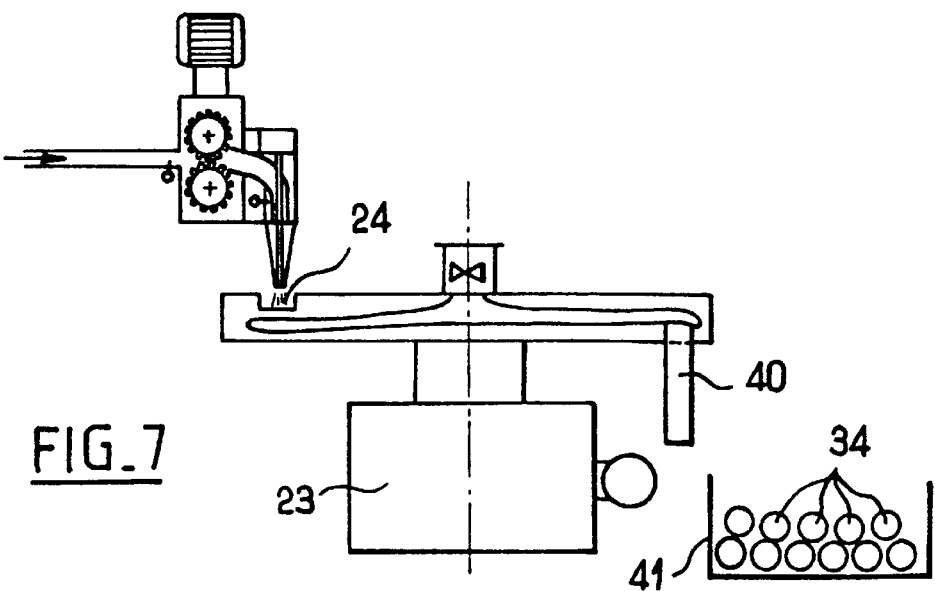
FIG_7

SEPARATION DEVICE FOR SHEET PRODUCTS AND ITS FABRICATION PROCESS

BACKGROUND OF THE INVENTION

1. Field of the Invention

The present invention relates to the handling, transport and storage of sheet products, particularly fragile products such as plates of glass. The invention pertains to a separation device in particular, which is to be temporarily inserted between the sheet products which are arranged essentially parallel with respect to one another on pallets or in crates.

Although the following description is given in relation to a separation device for plates of glass, other applications of the separation device for other sheet products are within the scope of the invention. The invention also pertains to a process for the fabrication of the separation device.

2. Discussion of the Background

Glass plates, especially glass plates for vehicles such as windshields, rear windows and side windows are normally placed in a position which is approximately vertical in pallets for their transport and storage. In order to avoid damage or breaking of the glass plates, which are caused in particular by contact with one another during their transport, the glass plates are kept separate from one another in the pallets. In this way they can be held in a separated position in their lower part by racks attached to the base of the pallet, provided with slots having a width equal to the thickness of the glass plate so as to allow installation of the glass plates, and on the other hand in an upper part there are separating tabs which overlap the edge of the glass plates and separate two adjacent glass plates by maintaining a separation space.

However, more and more frequently glass plates for vehicles are supplied to manufacturers already equipped with special shapes, particularly peripheral shapes, made of plastic which are obtained by encapsulation or extrusion. These shapes can be arranged on the periphery of the glass plates, with widths and thicknesses that vary and can be used, for example, for installation of the glass plates in the body openings of the vehicle. They can also be used as runners for lateral windows or sliding roofs. In order to support these functions the profiles given to the glass plates have highly defined shapes and dimensions. Therefore it is important that these profiles not be altered or deformed during the handling of the glass plates and particularly during their transport. In addition, the glass plates which are arranged in a pallet and inclined slightly in order to improve their stability will form a sort of stack, the subsequent glass plates exerting a force, which depends on their weight, on the preceding plates of glass, which are placed at the beginning of the stack. The separation tab therefore must have a profile which is adapted to the peripheral profile of the glass plate. It follows that a single type of tab cannot be used for several types of glass plates.

Instead of tabs it is also known that one can use separation pieces which are inserted between two adjacent plates of glass which are applied to the surfaces of the glass. A separation device is also known which is formed of a parallelepiped body of a barely compressible material and of which one side is non-adhesive with a glass surface, cork for example, with a thickness approximately equal to the interlayer distance, and of a layer covering the opposite side, made of a soft or compressible material, foam PVC for example, which allows adhesion at least temporarily to the glass surface, this adhesion in practice leaving no subsequent mark on the glass.

A disadvantage of this type of separation device is that it generally cannot be used a second time, such as a tab can be, its adhesive surface having lost at least part of its original adhesive properties.

Another, and more important, disadvantage is that it cannot be re-used for another application, principally due to the fact of its structure with two layers based on very different materials, made of cork in particular.

It is also known from publication of the German utility patent GM 9,215,354 that a separation device formed by a thermoplastic material such as PVC, which has one very smooth side giving it properties of adhesion with a glass surface, and a ribbed opposite side that is not adhesive with such a surface.

A disadvantage of this separation device first is that it calls for separate fabrication at a place different from that of its use. Another disadvantage is that the very smooth adhesive side is capable of losing its properties of adhesion through contact with dust, oil or other polluting substances, so that the nature of the material of which the separation device is formed will not allow easy reactivation of this adhesive quality.

SUMMARY OF THE INVENTION

The present invention overcomes the above mentioned disadvantages. An object of the present invention is to provide for a new separation device which is to be temporarily inserted between two products made of sheet materials, between two glass plates in particular, this separation device having two approximately parallel sides, and being made of a thermofusible or hot melt material having an ability to absorb shocks, and capable of producing controlled adhesion for one of its sides with the sheets to be separated.

In accordance with one of the features of the invention the separation device is a recyclable material and its side which can have adhesive properties can be reactivated by modifying its surface condition with heat or a solvent.

In a variant of the invention, the side which can have adhesive properties can be reactivated giving the side a liquid or viscous form, of the same material which constitutes the separation device or of any material belonging to this same family in terms of recycling.

According to another feature of the separation device the latter can also be made away from the use site or directly at this location. In addition, its adhesion with the sheets to be separated can be controlled whatever the temperature of the use site.

According to one form of implementation in accordance with the invention the separation device is selected from among materials which have a "melting" temperature less than 250° C. and preferably between 50° and 200° C., and in an even more preferable manner between 60° and 100° C. In this method of implementation one must melt or at least soften and make conformable at a slightly increased temperature the side of the separation device which is to be adhered to the sheet to be separated. Preferably the material will have a narrow temperature interval during which the "melting" is carried out.

While one side of the separation piece must have specific adhesive properties with the products to be separated, being sufficiently adhesive to remain in place during the entire duration of use of the separation device, but not too much so that the separation device can be easily withdrawn at the proper time, without leaving any trace (or mark) on the product to be separated, in particular when one is using a plate of glass, but the other side of the separation piece, on the other hand, must be non-adhesive in order to avoid, in particular, any difficulty when the sheet products are removed from the stacks. This other side can advantageously be shaped (not flat).

A base material which can form the separation piece in accordance with the invention can be selected from among copolymers of the polyethylene type with polar chains such as ethylene-vinyl-acetate (EVA) copolymers which are modified or not, ethylene-butyl-acrylate, ethylene-methyl-acrylate copolymers, ethylene-ester acrylic-maleic anhydride terpolymers, polyamides and their copolymers.

EVA materials which are preferred in particular preferably contain a vinyl-acetate content from 26 to approximately 30% and have a creep limit in the molten state of approximately 25 which means that it can be quickly softened, if necessary at the time of application of the separation piece to the product.

The base material must have mechanical properties, particularly energy absorption (or shock absorption) but nevertheless be sufficiently rigid to carry out the function of the separation piece.

In order to improve the energy absorption properties one can advantageously introduce into the composition of the material a thermoplastic polymer or copolymer of the styrene-butadiene-styrene type.

This can also be natural rubber, butyl rubber, polyisobutylene, SDR, polybutadiene, EPDM (ethylene-propylene-diene-monomers), EPR, or nitrile rubber.

Preferably one will use CARIFLEX$^R$ which are di- or triblock/styrene-butadiene polymers or isoprene or ethylene-butylene.

In order to improve cohesion of the material one can advantageously add to the composition a mineral oil, for example and preferably a paraffin oil which can additionally affect the viscosity in the molten state of the material.

One could also introduce into the composition a wax which will improve the flow performance when warm. The wax also allows one to adjust the level of non-adhesion of the non-adhesive side.

Numerous waxes, crystalline or not, and numerous paraffins with more linear macromolecular structures, which cover a broad array of freezing points (50° to 100° C.) and of hardness can be used. Preferably one will select waxes that have an increased freezing point, particularly between 88° and 92° C., and an elevated hardness.

Other additives can also be added to the composition. One can use charges such as chalk which in addition to regulation of the hardness can also facilitate mixing of the ingredients while reducing the return cost of the separation device. One can also use anti-oxidants, coloring agents, and so forth.

In one form of implementation of the separation device in accordance with the invention it is made of a material which includes, expressed in percentages by weight:

20 to 70% of a polymer or copolymer of the polyethylene type with polar chains;
10 to 50% of a material which has energy absorbing properties;
10 to 50% of a wax;
10 to 40% of a mineral oil.

In a preferred method of implementation of the separation device the latter is made of a material which includes, expressed in percentages by weight:

20 to 70% of an EVA copolymer;
10 to 50% of a styrene-butadiene-styrene copolymer;
10 to 50% of a wax;
10 to 40% of a paraffin oil.

One of the advantages of the separation device in accordance with the invention is that it can be manufactured directly at the place of use at the time of use as described subsequently, its side then being adhesive because of the very process of fabrication, or on the contrary the separation device can be fabricated in advance then generally being reactivated at the time of its use.

Another advantage of the separation device in accordance with the invention is that it can be deposited intermittently particularly because of the material that is used which, for example, does not cause swelling of the material at the outlet from an extrusion die.

Other characteristics and advantages of the separating device in accordance with the invention will be apparent in the following example:

EXAMPLE

One prepares the base material for a separation device from the following composition, expressed in parts by weight:

33 parts of an EVA copolymer containing 28% by weight of vinyl acetate and having a creep index of 25 in accordance with ASTMD 1238, the commercially available product under the name ESCORENE$^R$, for example, offered by Exxon company;

16.5 parts of a styrene-butadiene-styrene (SBS) copolymer, for example the product made available commercially under the name EUROPRENER SOL T163 by Enichem company;

16.5 parts of a wax, for example the product offered commercially under the name ASTOR$^4$ DO 820 by the company Astor Stag;

16.5 parts of a paraffin oil, for example the product made available commercially under the name ENERPAR$^4$ 10 by BP company;

16.5 parts of a mineral load, for example the product made available commercially under the name SETACARB$^R$ OG by Omya company;

0.4 parts of an anti-oxidant, for example the product made available commercially under the name IRGANOX$^4$ 1010 by the company Ciba Geigy;

0.6 parts of a coloring agent, for example the product made available commercially under the name PLASTIPASTA NOIR$^R$ by the company Inducolor.

By using this mixture one will obtain a thermofusible material in which the "melting" is carried out in a temperature range of 65°75° C., from which one can make the separation device.

Thus, in order to make a separation device for window glass, one can use the process described subsequently which is one of the purposes of the invention, adhering to the following successive stages:

filling a container with the thermofusible material;
melting the thermofusible material;
pumping the thermofusible material;
extruding the material while monitoring its volumetric flow rate;
filling, with the thermofusible material, a mold form which is used to make the separation piece; and then:
applying the still liquid free side of the separation piece to the window glass to be separated; or also one can:

cool the thermofusible material of the element in order to solidify it;

remove the element from the mold;

make liquid the side which is to adhere to the window glass to be separated; and:

apply the liquid side of the element to make it adhere by gluing to the window glass to be separated.

In order to overcome inertia and to control the melt thickness of the side that has been made liquid, the liquefying stage of the side that is to adhere can be made by applying molten thermofusible material which can be the same as that of the element;

In a variant, the stage of liquefaction of the side to be adhered to is conducted by heating.

The side of the separation piece opposite to the side that is to be adhered to can be marked in such a manner that it will be given a structured surface during molding.

In order to allow one to automate the aforementioned process, a further object of the invention is to provide for an installation of the type which will include a vacuum-container device which can receive a container of thermofusible material, the container being connected to a volumetric gun for dispensing thermofusible material into at least one part of a mold, the installation including at least one means of marking which is in contact with the material in the mold section, a means of cooling and a means of transfer in order to remove the element in order to bring it to the station for making its side liquid.

According to another feature of the invention, the installation will include a means, in particular a dispensing nozzle on the element cooled by drifting of liquid thermofusible product, the dispensing means connected to the vacuum-container being located upstream from the volumetric nozzle.

A further object of the invention is to provide for a device according to which the mold will include at least a second section in the shape of a bar which allows one to make bars of the thermofusible product which are used to supply a nozzle which manually dispenses liquid product onto one side of the element.

According to other features of the device:

the mold and the means of cooling are comprised of a rotating table which includes sections that are arranged along a circular trajectory, the table including a means of step-by-step rotational movement corresponding to the spacing of each section, the means of marking being comprised by the shape of the bottom part of the section or the shape of the surface of a pushing device which forms the section;

the transfer means is an aspiration-operated suction cup.

Accordingly, a feature of the present invention relates to a separation piece which is to be inserted temporarily between two sheet-type products. The separation piece has differentiated adhesion with the two sheet-type products and is essentially made of a thermofusible material having a capacity for absorption of shocks and an ability to offer on a first one of its two sides controlled and desirable adhesion with sheets to be separated.

The present invention also relates to a process for the fabrication of the separation piece noted above which includes filling a mold section with a liquid thermofusible material and applying a still liquid free side of the separation piece to the product to be separated.

The present invention also relates to a process for the fabrication of a separation piece which comprises the steps of filling a mold section with a liquid thermofusible material; cooling the thermofusible material in order to solidify it and form a solid separation piece; removing the solid separation piece from the mold; liquefying a side of the separation piece which is to be adhered to a sheet-type product to be separated; and applying the liquid side of the separation piece to the sheet-type product.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so stated, and it is to be understood that each specific element includes all technical equivalents which operate for a similar purpose.

A more complete appreciation of the invention and many of the attendant advantages thereof will be readily obtained as the same becomes better understood by reference to the following detailed description when considered in connection with the accompanying drawings, wherein:

FIG. 3 shows in a top view the indexing table according to FIGS. 1 and 2;

FIGS. 4, 5 and 6 are partial, schematic, sectional views illustrating the various phases of shaping the separation devices;

FIG. 7 schematically shows one part of the installation in accordance with the invention which allows one to manufacture insertion elements for manual placement in vertical section;

DESCRIPTION OF THE PREFERRED EMBODIMENTS

Figure 1:
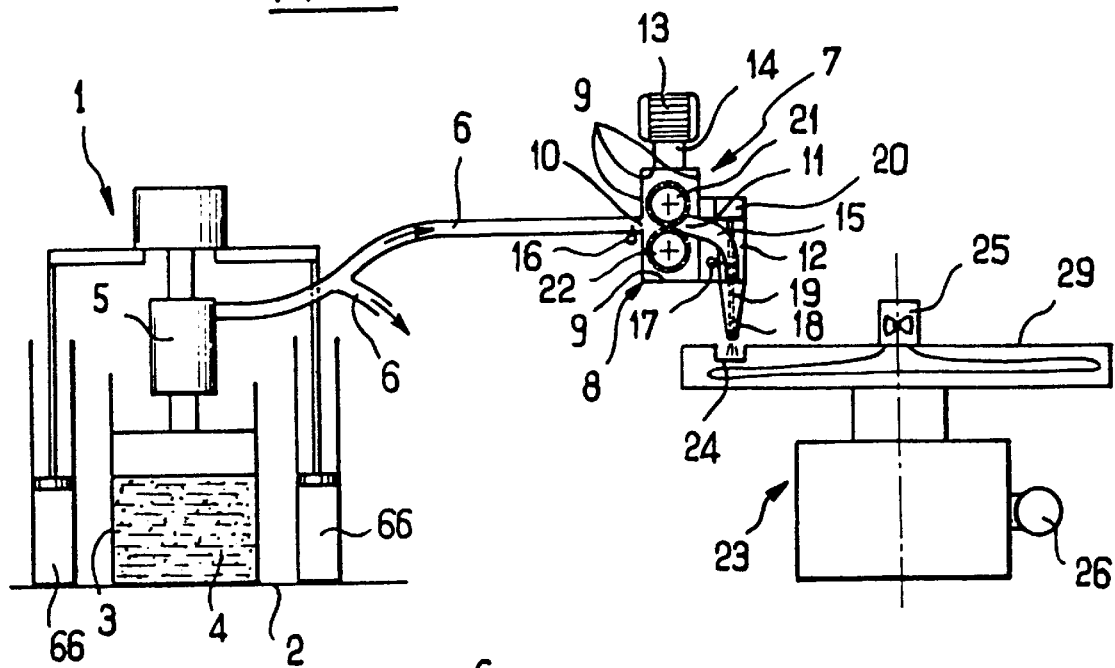
FIG. 1 schematically shows a fabrication unit for positioning and inserting an installation in accordance with the invention and the fabrication devices.

Referring now to the drawings, wherein like reference numerals designate identical or corresponding parts throughout the several views, the installation shown in FIG. 1 includes a vacuum-container device 1. The device 1 includes a chassis 2 on which a reservoir or container 3 is placed, which is filled with thermofusible product 4. A pump group 5 is arranged above the container 3. Some hydraulic jacks 66 adjust the pump group 5 as a function of the level of the surface of the thermofusible product 4 contained in the receptacle 5. The pump group 5 is connected by the piping 6 to a geared nozzle 7 for distribution of the warm product, that is to say in liquid form.

The nozzle 7 includes a housing 8 bordered by six plane walls 9. One wall represents a delivery opening 10; the opposite wall includes an outlet opening 11 which opens into a nozzle 12. An electric motor 13 controlled by an electronic variable speed switch is attached to a wall 9.

The nozzle 12 and the motor 13 are positioned on housing 8 through the intermediary of a warming support element 14. The pipe 6 which brings in the thermofusible product 4 is connected to the delivery opening 10. The channel 15 connects the outlet opening 11 to the nozzle 12. Two pressure reading devices 16, 17 are installed respectively in the delivery opening 10 and in the outlet channel 15 which goes into nozzle 12. Nozzle 12 includes an extrusion opening 18 which is tapered and cross-shaped that can be blocked by a stem 19 that forms a valve and is one piece with a pneumatic positioning jack 20.

The housing 8 contains gearing formed by two pinions 21 and 22. The pinion gears 21 and 22 which are parallel to one another are installed perpendicular to the outlet opening 11.

The nozzle 7 supplies an indexing table 23 with the product. The table 23 includes sections 24 for the molding and a means of cooling 25. The table 23 which includes a device 26 for establishing step-by-step movement is circular as shown in FIG. 3 and the mold sections 24 are arranged near the edge in a circular trajectory. A push device or pushrod 27 allows one to shape the sections 24.

The nozzle 7, pushrod 27 and gripper or gripping device 28, all of which are moving with respect to surface 29 of the table 23, are arranged above the trajectory of the mold sections 24.

Figure 2:
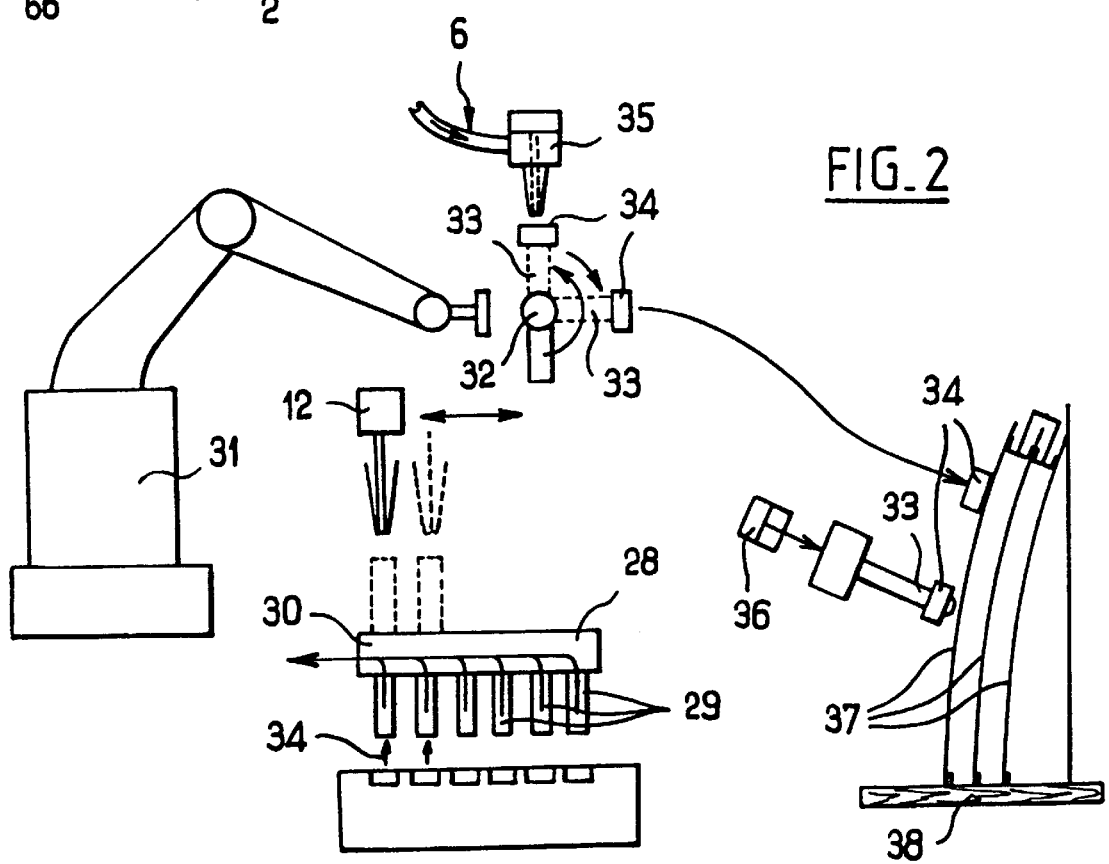
FIG. 2 schematically shows in vertical section the positioning and dispensing devices of a unit in accordance with the invention, which complements FIG. 1.

The installation in accordance with the invention also includes the gripping device 28 with suction cups 29 for aspiration of air 30, as shown in FIG. 2. The gripping device 28 is manipulated by a robot 31 up to an articulated mechanism 32 which includes a platform 33 for receiving the element 34. The articulated platform 32 being placed in an extrusion nozzle 35 connected to the pipe 6. A hydraulic jack 36 pushes mechanism 32 forward to the windshield made of stacked glass on a pallet 38.

Functioning of the installation is as follows, the product 4 is pumped into receptacle 3 by the pump group 5 which supplies the nozzle 7 through conduit 6.

Product 4 is drawn in toward the extrusion orifice 18 by rotation of pinions 21, 22 of the gearing. The pinion gears 21, 22 are drawn and controlled in rotation by the motor, therefore the motor controls the flow rate. The robot 31 allows the motor to begin operation and also allows the opening of the nozzle such that when the nozzle 7 is in a working position above the mold section 24, the product flows out at a controlled flow rate, which allows one to obtain repetitive filling of the mold section. Next the indexing table 23 rotates one step so as to bring the mold section 24 which has just been filled under pushrod 27 and the next section under nozzle 7.

At this time the pushrod 27 whose support side can be marked, drops down as shown in FIG. 4. This pushrod 27 drops down to the surface of the mold section or into section 24 as shown in FIG. 5. Next the pushrod 27 is withdrawn and the warm element 39 shown in FIG. 6 is formed. The cycle ends with the closing of the tube and the simultaneous stopping of the motor controlled by the robot and of the table.

After several stages of step-by-step movement of table 23 the cooled elements are discharged from sections 24 by gripping device 28 and brought to the liquid product dispensing tube 35 on the smooth side of element 34; next the jack 36 pushes until there is sticking of the liquid side of element 34 to the glass windshield.

Robot 31 positions and places gripping device 28, pushrod 27 and tube 35.

In a variant the bottom of the mold section 24 is marked in bas-relief and the pushrod is smooth.

In a second variant the vacuum-receptacle device includes a fixed pump group 5 and a movable receptacle arranged on an elevating seat which conforms to the German utility patent G 94 20028.9.

The unit shown in FIG. 7 differs from that of FIGS. 1 and 2 in that it does not include an automatic liquid product dispensing tube 4 on elements 34, or means for automatic transfer of these elements to the windshield 37.

The corresponding references to those of the preceding figures are retained in FIG. 7.

Figure 8:
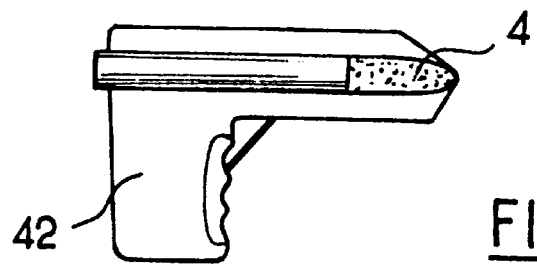
FIG. 8 shows a nozzle for manual placement of the liquid side.

Table 23 includes a very deep circular mold section 40 which forms a bar of thermofusible product. Different from the preceding unit, the unit of FIG. 7 includes a box 41 that the robot fills with elements 34. FIG. 8 shows a known glue type nozzle 42. The bar coming from section 40 is introduced into the glue nozzle 42, which allows one to place the liquid side on elements 34 by melting the end of the bar.

Figure 9:
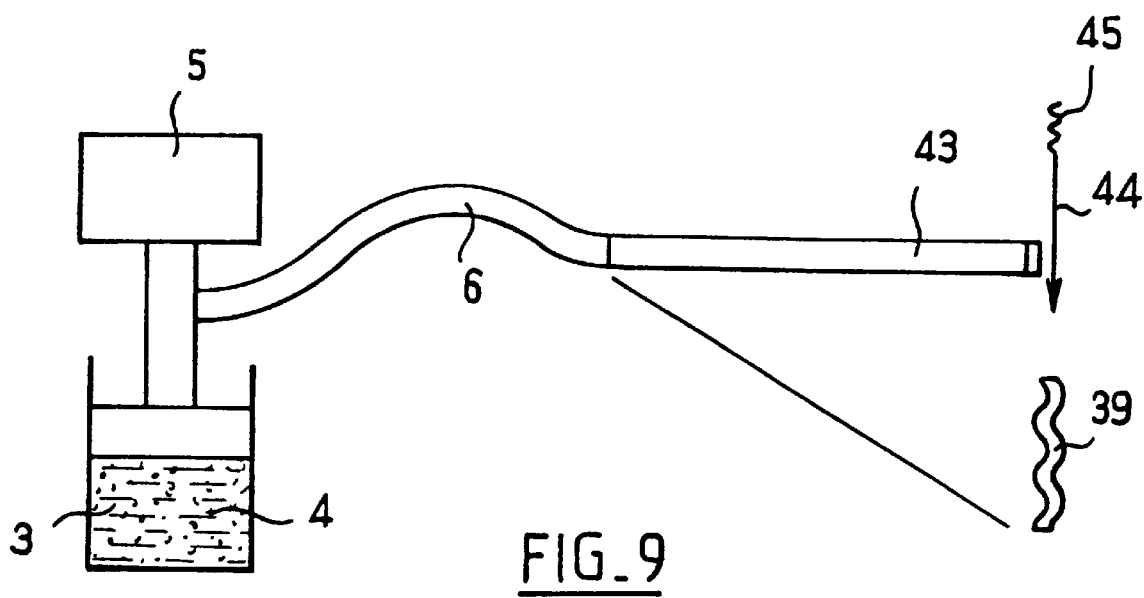
FIG. 9 shows a variant of the fabrication device of an installation in accordance with the invention.

FIG. 9 shows another variant of the fabrication unit of elements in accordance with the process of the invention.

This installation includes a receptacle 3 with thermofusible product 4 pumped in by a pump group 5 through a piping system 6 which fills the metal cooling tube 43 whose outlet opens into channel 44 of a blade notched 45 so as to cut off drops of product 4 to form elements 39 in accordance with the invention.

Figure 10:
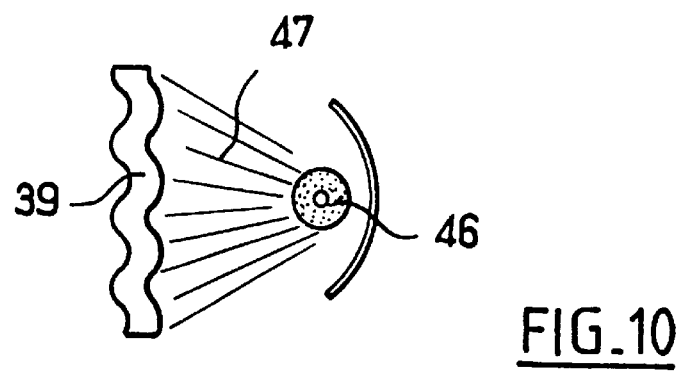
FIG. 10 shows a variant of the stage of the process for making the liquid side.

FIG. 10 shows a variant of the stage for making the liquid side of element 34. In this variant element 34 is brought near a source of heat 46 whose radiation 47 will melt the closest side, element 34 being comprised of a thermofusible material.

In order to clearly demonstrate the advantages of the aforementioned separation device E1, in accordance with the invention, and especially the possibilities of thermal reactivation or solvent reactivation of its adhesive properties, with respect to a known separation piece denoted EC such a separation piece made of PVC plastified to 50% and of a Shore A hardness factor of 65, we have made separation pieces in the form of pellets with two parallel sides in accordance with the invention and we have carried out the following tests.

The separation piece is compressed between two plates of flat glass (dimensions 75×75×6 mm) which are arranged horizontally due to the action of a 5 kg load placed on the upper plate for 1 minute. The plates of glass are then separated by hand. According to their surface condition (flatness, contamination) the spacing devices can either adhere to one of the sides of the glass (which we designate by plate A), or can fall.

In the first case the plate of glass (A) to which the separation device adheres which is provided with a thermocouple in order to measure the temperature is placed beneath an infrared lamp. Once the temperature is reached as indicated in the following table, the heating is turned off and plate (B) is applied to the opposite side of the separation piece due to the action of a 5 kg load for 1 minute. After cooling for 5 minutes the two glass plates are then separated by hand, and the position of the separation piece adhering either to plate (A) or plate (B) is noted. The tests are repeated for 10 cases and the results are gathered in the table.

In the second case the separation piece which has fallen is placed by hand on one of the glass plates (designated A) and the procedure described above is applied.

In some cases the infrared reactivation is replaced by contact of a drop of solvent allowed to evaporate over a certain amount of time (indicated in the table).

In a certain number of cases the separation pieces are contaminated by a friction with powder of calcium carbonate (granulometric size: 0.7 micrometers) in order to simulate samples to be recycled, contaminated by dust particles (E1-S according to the invention or EC-S which is known).

The following Table 1 combines the different tests.

Table 1 demonstrates the advantages of the separation piece in accordance with the invention with respect to a separation piece made of plastified PVC, especially its great facility for reactivation (or activation) of its side which is to be adhered to the plate of glass and in particular a very low reactivation temperature, which allows rapid rate of movement.

| Tests | Separation pieces | Activation | No. of samples on the side A | B |
|---|---|---|---|---|
| 1 | E1 | Infrared at 70° C. | 0 | 10 |
| 2 | E1 | Toluene + 5 minutes drying | 0 | 10 |
| 3 | E1-S | Infrared at 100° C. | 0 | 10 |
| 4 | EC | Infrared at 70° | 0 | 0 |
| 5 | EC | Infrared at 100° | 0 | 0 |
| 6 | EC | Infrared at 150° | 5 | 5 |
| 7 | EC | Infrared at 160° | 0 | 10 |
| 8 | EC | Cyclohexanone + 30 minues drying | 2 | 8 |
| 9 | EC-S | Infrared at 160° c. | 2 | 8 |

The separation piece in accordance with the invention absorbs shocks very well and its application for fragile sheet type products such as plates of glass turns out to be quite advantageous, especially for automobile glass, such as windshields, rear windows, side windows, roofs, which normally are in approximately vertical position in pallets or holders for their transport and storage.

The separation piece in accordance with the invention can be presented in the form of pellets with variable dimensions. It can also be in the form of continuous or discontinuous thin strips. It can also be deposited by extrusion directly onto the product to be separated, especially in the form of pellets, of thin continuous or discontinuous strips.

The separation pieces are also placed on plate type products, especially sheets of glass which are at ambient local temperature. It can also be arranged on sheets of glass in particular which are at an increased temperature.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A separation piece to be inserted temporarily between two sheet products, wherein the separation piece is comprised of a thermofusible material having a capacity for absorption of shocks, wherein a first side of the separation piece has a controlled and desirable adhesion with the sheet products to be separated, and wherein a second side of the separation piece is substantially non-adhesive,
    wherein the thermofusible material is based on at least one polymer or co-polymer of the polyethylene type with polar chains and the thermofusible material includes, expressed in percentages by weight:

20 to 70% of a polymer of co-polymer of the polyethylene type with polar chains;
   10 to 50% of a material having energy absorption properties;
   10 to 50% of a wax;
   10 to 40% of a mineral oil.

2. A separation piece according to claim 1, wherein the first side of the separation piece has adhesive properties which can be reactivated by modification of its surface condition by heat or by a solvent.

3. A separation piece according to claim 1, wherein the adhesiveness of the first side of the separation piece can be reactivated by placing on said first side a material belonging to the same family as that of the separation piece, in a liquid or viscous form.

4. A separation piece according to claim 1, wherein the thermofusible material has a melting temperature less than 250° C.

5. A separation piece according to claim 4, wherein the thermofusible material has a narrow temperature interval during which melting occurs.

6. A separation piece according to claim 1, wherein a second side of said two sides is a non-adhesive side which has a pattern.

7. A separation piece to be inserted temporarily between two sheet products, wherein the separation piece is comprised of a thermofusible material having a capacity for absorption of shocks, wherein a first side of the separation piece has a controlled and desirable adhesion with the sheet products to be separated, and wherein a second side of the separation piece is substantially non-adhesive, wherein the thermofusible material includes an ethylene-vinyl-acetate (EVA) material and the thermofusible material includes, expressed in percentages by weight:

20 to 70% of a EVA co-polymer;
   10 to 50% of a styrene-butadiene-styrene copolymer;
   10 to 50% of a wax;
   10 to 40% of a paraffin oil.

8. A separation piece according to claim 7, wherein the first side of the separation piece has adhesive properties which can be reactivated by modification of its surface condition by heat or by a solvent.

9. A separation piece according to claim 7, wherein the adhesiveness of the first side of the separation piece can be reactivated by placing on said first side a material belonging to the same family as that of the separation piece, in a liquid or viscous form.

10. A separation piece according to claim 7, wherein the thermofusible material has a melting temperature less than 250° C.

11. A separation piece according to claim 10, wherein the thermofusible material has a narrow temperature interval during which melting occurs.

12. A separation piece according to claim 10, wherein a second side of said two sides is a non-adhesive side which has a pattern.

* * * * *